United States Patent
Fieberg et al.

(10) Patent No.: US 7,112,628 B2
(45) Date of Patent: *Sep. 26, 2006

(54) AQUEOUS ELECTRODEPOSITION PAINTS AND THE PRODUCTION AND USE THEREOF

(75) Inventors: Andreas Fieberg, Düsseldorf (DE); Volker Rekowski, Bochum (DE); Dietrich Saatweber, Wuppertal (DE); Hans-Ulrich Simmrock, Düsseldorf (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/148,937

(22) PCT Filed: Dec. 1, 2000

(86) PCT No.: PCT/EP00/12085

§ 371 (c)(1),
(2), (4) Date: Nov. 4, 2002

(87) PCT Pub. No.: WO01/40346

PCT Pub. Date: Jun. 7, 2001

(65) Prior Publication Data
US 2003/0121786 A1  Jul. 3, 2003

(30) Foreign Application Priority Data
Dec. 4, 1999 (DE) ................. 199 58 488

(51) Int. Cl.
*C08G 18/62* (2006.01)
(52) U.S. Cl. ................. 524/591; 524/901; 522/96; 205/224; 205/229; 427/458; 427/473; 526/301; 528/49; 528/75
(58) Field of Classification Search .......... 428/423.1, 428/425.8, 425.9; 524/591, 901; 522/96; 205/224, 229; 427/458, 473; 526/301; 528/49, 528/75
See application file for complete search history.

(56) References Cited

U.S. PATENT DOCUMENTS 4,732,788 A * 3/1988 Guioth et al. ............... 204/500
6,509,411 B1 * 1/2003 Fieberg et al. .............. 524/591

* cited by examiner

*Primary Examiner*—Thao T. Tran

(57) ABSTRACT

Aqueous electrophoretic lacquer capable of being deposited cataphoretically, containing
A) an aqueous dispersion of cationically modified polyurethane (meth)acrylates (a1) with terminal, ethylenically unsaturated (meth)acrylic double bonds, and reactive thinner (a2) with at least two ethylenically unsaturated (meth)acrylic double bonds, the (meth)acrylic double bonds of the mixture of (a1) and (a2) corresponding to a bromine number of 20 to 150 g bromine/100 g solids, and
B) photoinitiators and optionally free-radical initiators capable of thermal activation,
the terminal, ethylenically unsaturated (meth)acrylic double bonds of the polyurethane (meth)acrylates being bonded with the anionically modified polyurethane prepolymer via urethane, urea, amide or ester groups,
and optionally conventional auxiliary substances and additives, pigments and/or fillers.

9 Claims, No Drawings

AQUEOUS ELECTRODEPOSITION PAINTS AND THE PRODUCTION AND USE THEREOF

BACKGROUND OF THE INVENTION

The invention relates to aqueous electrophoretic lacquers capable of being deposited cataphoretically, which are curable by high-energy radiation and have the advantage of a good full cure even with high film thicknesses, and give good mechanical properties and, in particular, high resistance in an industrial gas atmosphere. It also relates to their production and use for the lacquering of electrically conductive substrates, e.g. of metal, electrically conductive plastic, e.g. metallised plastic, or electrically conductive coatings.

Coatings applied by the electrophoretic lacquer process have the advantage that they contain only a small quantity of residual water. The coating obtained does not therefore have to be pre-dried after rinsing off any bath material still adhering, but can be cured by high-energy radiation after possibly blowing off droplets of water.

In U.S. Pat. No. 4,039,414, compositions for the electrophoretic lacquer process are described containing a photoinitiator, dispersed in an ethylenically unsaturated polymer, dispersed in an aqueous phase, which can be deposited at a cathode and cured with TV radiation. In general, a number of acrylated polymers are mentioned, among which, as the only polyurethane acrylate, one that uses toluylene diisocyanate and polyether polyols as structural components is described. Lacquers on this basis have a tendency towards severe yellowing and towards early signs of degradation caused by weathering, leading to cracking, reduction in gloss and chalking, and also prove relatively brittle.

The invention was therefore based on the object of providing aqueous electrophoretic lacquers capable of being deposited cataphoretically, which do not exhibit these defects, which cure fully by high-energy radiation, even in high film thicknesses, and give lacquer films with improved properties compared with the prior art, particularly with regard to resistance in an industrial gas atmosphere, improved flexibility and good adhesion to the substrate.

SUMMARY OF THE INVENTION

It has been shown that this object can be achieved with the aqueous electrophoretic lacquer capable of being deposited cataphoretically provided by the invention, which contains
A) an aqueous dispersion containing one or more cationically modified, preferably linear polyurethane (meth) acrylates (a1) with terminal, ethylenically unsaturated (meth)acrylic double bonds, and one or more reactive thinners (a2) with at least two ethylenically unsaturated (meth)acrylic double bonds, the (meth)acrylic double bonds of the mixture of (a1) and (a2) corresponding to a bromine number of 20 to 150 g bromine/100 g solids, and
B) optionally one or more photoinitiators and optionally one or more free-radical initiators capable of thermal activation,
the terminal, ethylenically unsaturated (meth)acrylic double bonds of the polyurethane (meth)acrylates being bonded with the cationically modified polyurethane prepolymer via urethane, urea, amide or ester groups,
and optionally conventional auxiliary substances and additives, pigments and/or fillers.

DETAILED DESCRIPTION OF THE INVENTION (Meth)acrylic here is intended to mean acrylic and/or methacrylic.

As component (A), an aqueous, cationic polyurethane dispersion consisting of e.g. 40 to 85 wt. % of component (a1), calculated as solid resin, and 15 to 60 wt. % of component (a2) is used. The aqueous, cationic polyurethane dispersion (A) has a solids content (polyurethane (meth) acrylate plus reactive thinner) e.g. of 30 to 70 wt. %, preferably 40 to 55 wt. %. Its content of terminal, ethylenically unsaturated (meth)acrylic double bonds corresponds to a bromine number of 20 to 150, preferably 20 to 80 g bromine/100 g solids (polyurethane(meth)acrylate plus reactive thinner).

The aqueous dispersion (A) can be produced e.g. by the following process:

A cationically modified urethane prepolymer with terminal NCO groups is first produced by reacting
i) one or more aliphatic, cycloaliphatic, araliphatic and/or aromatic polyisocyanates, the aromatic polyisocyanates preferably having a molecular weight of more than 174,
ii) one or more higher-molecular-weight polyhydroxyl compound(s) with a number average molecular weight (Mn) of e.g. 400 to 5000, preferably 1000 to 2500,
iii) one or more compound(s) having a group that is cationic by neutralisation and two groups that are reactive towards isocyanates and
iv) optionally one or more low-molecular-weight polyhydroxyl compounds, e.g. with a number average molecular weight (Mn) of 60 to less than 400.

The reaction can take place e.g. in a single- or multi-step process, free from solvents or in a polar solvent inert towards NCO groups.

The quantities of components (i) to (iv) in this process are selected e.g. such that the ratio of NCO groups to OH groups is between 4:1 and 1.1:1.

The ethylenically unsaturated groups are then added to the free NCO groups. This takes place e.g. by reacting with compounds (v), which have one or more ethylenically unsaturated (meth)acrylic groups and one or more groups that are reactive towards isocyanates, the stoichiometric ratios of groups that are reactive towards NCO groups to isocyanate groups being selected such that no free NCO groups remain.

To regulate the functionality (number of ethylenically unsaturated (meth)acrylic double bonds), compounds (vi) having one or more, preferably one group that is reactive towards isocyanates, but containing no (meth)acrylic double bonds, can also be incorporated. They can contain other ethylenically unsaturated double bonds or can be free from them. Following the reaction of components (i) to (iv) for the production of a urethane prepolymer, the compounds (vi) can, for example, be fed into the reaction before, together with or after reaction with component (v).

The free NCO groups can, however, also be reacted first with compounds which, in addition to a group that is reactive towards isocyanates, contain one or more other reactive groups, which in turn can react with groups of ethylenically unsaturated (meth)acrylic compounds having complementary reactivity, such as e.g. hydroxycarboxylic acid with glycidyl (meth)acrylate. In this way, for example, (meth)acrylic double bonds bonded to the polyurethane prepolymer via ester groups can be introduced.

The cationically modified polyurethane (meth)acrylates with terminal, ethylenically unsaturated (meth)acrylic double bonds (a1) have a number average molecular weight Mn of e.g. 800 to 5000 and/or a weight average molecular weight Mw of 5000 to 20000, preferably less than 20000. Their amine value is preferably 5 to 80, particularly preferably 10 to 60. Their content of terminal, ethylenically unsaturated (meth)acrylic double bonds is preferably 4 to 80 g bromine/100 g solid resin, particularly preferably 5 to 35 g bromine/100 g solid resin.

The component (a1), obtainable as described above, is diluted with the reactive thinner (a2), at least partially neutralised and transferred into the aqueous phase. At least 25% of the amino groups are preferably present in neutralised form. The neutralising agent can be added before or with the water, but it can also be previously added to the water in which the polymer is dispersed. It is not necessary to add external emulsifiers. For the purpose of transferring into the aqueous phase, for example high-speed disc stirrers, rotor-stator mixers or high-pressure homogenisers are used. The inert solvent is then distilled off, with the optional application of a vacuum.

However, the reactive thinner (a2) can also be added subsequently to the dispersion that is already aqueous. In this case the aqueous dispersion is produced as described above, with component (a1) initially not yet being diluted with the reactive thinner (a2) or only being diluted with part of the reactive thinner (a2).

Any organic di- and/or polyisocyanates with aliphatically, cycloaliphatically, araliphatically and/or aromatically bonded free isocyanate groups having an average of more than one, preferably two, isocyanate groups per molecule are suitable as polyisocyanates (i). Aliphatically, cycloaliphatically and/or araliphatically bonded di- and/or polyisocyanates are preferred. Aromatic diisocyanates preferably have a molecular weight of more than 174.

Polyisocyanates containing about 3 to 36, particularly preferably 8 to 15, carbon atoms are preferred. Examples of suitable diisocyanates are diphenylmethane diisocyanate and particularly hexamethylene diisocyanate, tetramethylxylylene diisocyanate, isophorone diisocyanate, dicyclohexylmethane diisocyanate, cyclohexane diisocyanate and mixtures thereof.

The so-called "polyisocyanate lacquer resins", for example, based on hexamethylene diisocyanate, isophorone diisocyanate and/or dicyclohexylmethane diisocyanate, are very highly suitable, i.e. the derivatives of these diisocyanates having biuret, urethane, uretdione and/or isocyanurate groups, which are known per se.

Examples of suitable higher-molecular-weight polyhydroxyl compounds (ii) are linear or branched polyols, e.g. with an OH value of 30 to 150. These are preferably saturated polyester and/or polyether diols and/or polycarbonate diols and/or so-called dimer fatty alcohols and/or poly(meth)acrylate diols, each with a number-average molecular weight Mn of 400 to 5000, e.g. 500 to 5000, or mixtures thereof.

Suitable linear or branched polyether diols are e.g. poly(oxyethylene) glycols, poly(oxypropylene) glycols and/or poly(oxybutylene) glycols, such as e.g. Terathane® grades from DuPont.

Polyester diols are preferred and can be produced in a known manner by esterification of dicarboxylic acids or their anhydrides with diols. To produce branched polyesters, polyols or polycarboxylic acids with higher functionality can also be used to a small degree.

Compounds containing two groups reacting with isocyanate, e.g. H-active groups, and at least one group capable of cation formation are introduced as suitable compounds (iii). Suitable groups reacting with isocyanate groups are particularly hydroxyl groups. Groups capable of cation formation are e.g. amino groups. Examples of these compounds are alkyl- or dialkylamino dialcohols with e.g. 1 to 8 C atoms in the alkyl portion, the dialcohols optionally being aliphatic, cycloaliphatic or aromatic, aliphatic dialcohols having e.g. 2 to 18 and cycloaliphatic e.g. 5 to 14 C atoms, or triamines with a tert. amino group, such as e.g. diethylaminopropanediol, methyldiethanolamine, N,N-diethylaminomethylamine, or ketimine-blocked triamines, such as e.g. ketimine-blocked diethylenetriamine. Aminotriols, such as e.g. triethanolamine, can optionally also be used.

Examples of suitable low-molecular-weight polyhydroxyl compounds (iv) preferably have a number-average molecular weight Mn of 60 to less than 500, e.g. of 60 to less than 400 and can contain aliphatic, alicyclic and/or aromatic groups. Suitable low-molecular-weight polyhydroxyl compounds are e.g. diois, triols or polyols, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, pentaerythritol, 2-cyclohexanediol, 1,4-cyclohexanedimethanol, bisphenol A, bisphenol F, neopentyl glycol, neopentyl glycol hydroxypivalate, hydroxyethylated bisphenol A, hydrogenated bisphenol A and mixtures of these polyols.

Suitable compounds (v) having one or more ethylenically unsaturated (meth)acrylic groups and one or more groups that are reactive towards isocyanates contain hydroxyl, amino and/or amide groups as reactive groups. (Meth)acrylic double bonds bonded via urethane groups are introduced into the polyurethane prepolymer via the hydroxyl-group-containing compounds (v); compounds (v) containing amino groups lead to bonding via urea groups; compounds (v) containing amide groups lead to bonding via "amide groups", with α-ketourea groups particularly being formed.

Examples of hydroxyl-group-containing compounds (v) are hydroxy (meth)acrylates, such as e.g. hydroxyl-group-containing esters of acrylic acid and/or methacrylic acid with 2 to 12, preferably 2 to 6 C atoms in the hydroxyalkyl radical, such as e.g. 2-hydroxyethyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, 7-hydroxyheptyl (meth)acrylate, 8-hydroxyoctyl (meth)acrylate and the corresponding isomeric compounds 2-hydroxy-1-methylethyl (meth)acrylate, 1,3-dimethyl-3-hydroxybutyl (meth)acrylate and others; reaction products of (meth)acrylic acid with polyols, such as e.g. glycerol diacrylate, trimethylolpropane diacrylate, pentaerythritol triacrylate; pre-adducts of glycidyl nethacrylate and hydroxycarboxylic acids, such as e.g. glycolic acid; reaction products of hydroxy (meth)acrylates with ε-caprolactone; reaction products of (meth)acrylic acid with the glycidyl ester of a carboxylic acid having a tertiary α-C atom, such as e.g. Cardura® from Shell.

Examples of amino-group-containing compounds are amino (meth)acrylates, such as e.g. tert.-butylaminoethyl (meth)acrylate, (meth)acrylic acid-β-ureidoethyl ester or reaction products of (meth)acrylic acid chloride and diamines.

Examples of compounds with amide groups are (meth)acrylamide, N-methylol (meth)acrylamide and isobutylmethylol (meth)acrylamide. The compounds (v) can be used individually or as mixtures.

Suitable compounds (vi) for regulating the functionality are e.g. higher glycol ethers and/or fatty alcohols and/or fatty amines. One or more aliphatic $C_4$–$C_{36}$ alcohols and/or amines can be used, for example, which are generally then reacted with complete consumption of their OH, NH or $NH_2$ groups. Fatty amines and/or fatty alcohols with more than 12 C groups are preferred. Examples are lauryl alcohol, stearyl alcohol and the corresponding amines.

Ethylenically unsaturated, particularly low-molecular-weight and oligomolecular compounds, are suitable as reactive thinners (a2). Unlike the polyurethane (meth)acrylate component (a1), the reactive thinners do not usually have any cationic modifications. The low-molecular-weight and/or oligomolecular reactive thinners can, for example, have calculated molecular weights in the order of magnitude of up to 10000, e.g. 100 to 10000. Suitable reactive thinners are e.g. di- and poly(meth)acrylates of glycols with 2 to 6 C atoms and polyols with 3 to 4 OH groups and 3 to 6 C atoms, such as ethylene glycol diacrylate, 1,3-propanediol diacrylate, 1,4-butanediol diacrylate, 1,6-hexanediol diacrylate, trimethylolpropane triacrylate, pentaerythritol triacrylate, pentaerythritol tetraacrylate and corresponding methacrylates, and also di(meth)acrylates of polyether glycols of glycol, 1,3-propanediol, 1,4-butanediol, tetraethoxylated trimethylolpropane triacrylate and/or oligourethane (meth)acrylates with 2 to 6 ethylenically unsaturated double bonds. Mixtures can also be used.

Conventional inorganic acids are suitable as neutralising agents, such as e.g. hydrochloric acid, sulfuric acid, sulfurous acid, phosphoric acid and chromic acid, but organic acids are preferred, particularly monocarboxylic acids, such as e.g. formic acid, acetic acid, propionic acid and particularly hydroxycarboxylic acids, such as e.g. lactic acid, glycolic acid, diglycolic acid, malic acid, citric acid, mandelic acid, tartaric acid, hydroxypropionic acid and dimethylolpropionic acid. Mixtures of such neutralising agents can also be used.

The stability of the dispersion can be influenced in the way that is familiar to the person skilled in the art by the selection of the neutralising agent. The quantity of neutralising agent is generally selected such that at least 25% of the ionic groups are present in salt form.

The electrophoretic lacquers according to the invention can optionally contain one or more photoinitiators and/or optionally one or more free-radical initiators capable of thermal activation. The electrophoretic lacquers according to the invention are preferably cured in the presence of photoinitiators, but the curing can also take place without photoinitiators.

Any initiators that are conventional for free-radically curing systems can be used as suitable photoinitiators (B), e.g. those absorbing in the wavelength range of 190 to 600 nm.

Examples are acetophenone and derivatives, benzophenone and derivatives, benzil, Michler's ketone, thioxanthone and derivatives, anthrone, anthraquinone and derivatives; benzoin and derivatives, benzoin ether and derivatives, dialkoxy acetophenones, acyloxime esters, benzil ketals, hydroxyalkylphenones; organophosphorus compounds, such as e.g. acylphosphine oxides; haloketones. The photoinitiators are used in conventional quantities, e.g. of 0.1 to 20 wt. %, preferably 0.1 to 5 wt. %, based on the sum of polymers that can be polymerised by free radicals (a1) and reactive thinner (a2). The photoinitiators can be used individually or in combination.

In addition to the photoinitiators mentioned, so-called photoactivators, such as e.g. tertiary amines, can be added. Synergistic effects are sometimes achieved with combinations of this type.

In a less preferred embodiment, the curing is performed without photoinitiators.

The aqueous electrophoretic lacquer capable of being deposited cataphoretically according to the invention can contain conventional lacquer auxiliary substances and additives in addition to the aqueous dispersion (A) and the photoinitiator (B), such as e.g. biocides, light stabilisers, flow promoters and optionally pigments and/or fillers.

The pigments and fillers in this case are the conventional fillers that can be used in the lacquer industry and inorganic or organic colouring and/or special-effect pigments and anticorrosive pigments. Examples of inorganic and organic colouring pigments are titanium dioxide, micronised titanium dioxide, zinc sulfide, lithopone, lead carbonate, lead sulfate, tin oxide, antimony oxide, iron oxides, chrome yellow, nickel titanium yellow, chrome orange, molybdenum red, mineral violet, ultramarine violet, ultramarine blue, cobalt blue, chrome oxide green, carbon black, azo, phthalocyanine, quinacridone, perylene, perinone, anthraquinone, thioindigo and diketopyrrolopyrrole pigments. Examples of special-effect pigments are metallic pigments, e.g. of aluminium, copper or other metals; interference pigments, such as e.g. metal oxide-coated metallic pigments or metal oxide-coated mica; pearlescent pigments and optically variable pigments (OVP).

Examples of fillers are calcium carbonate, barium sulfate, talcum, silicon dioxide, aluminium silicates, magnesium silicates, mica, aluminium hydroxide and silicas. The fillers can also be modified (coated) with organic compounds, which can also contain UV-curable groups. Examples of these modified fillers are coated micronised aluminium oxide or coated micronised silicon dioxide.

The aqueous electrophoretic lacquer capable of being deposited cataphoretically according to the invention can also contain other hydrophilic and/or hydrophobic polymers with or without reactive groups, such as e.g. hydroxyl, amino and other groups or mixtures of these polymers, which can optionally also be thermally crosslinked.

Examples of these polymers are saturated or unsaturated acrylic or polyester resins, acrylate-modified acrylic or polyester resins, epoxy resins, aminoplastic resins, phenolic resins and blocked polyisocyanates.

The electrophoretic lacquer is produced by mixing components (A) and (B) and optionally other lacquer auxiliary substances and additives, e.g. with the aid of conventional mixers such as e.g. (high-speed) stirrers, static mixers, rotor/stator mixers and other homogenisers.

The pigments and/or fillers that are optionally incorporated are processed in a portion of component (A) or a special paste resin in a known manner by conventional dispersing processes to form a pigment paste, which is mixed into components (A) and (B) as described above.

In the case of the initial filling of an electrophoretic lacquer bath, the electrophoretic lacquer produced in this way can optionally be adjusted to the desired bath MEQ value with farther neutralising agent and adjusted to the desired bath solids with deionised water. The MEQ value is a measure of the content of neutralising agent in a water-based lacquer. It is defined as the quantity of milliequivalents of the neutralising agent based on 100 g of solids.

In the case of post-compensation, the amino groups of component (A) can be only partly neutralised to compensate for the neutralising agent released during deposition.

The bath MEQ value is e.g. 15 to 70, preferably 20 to 45 milliequivalents of neutralising agent, e.g. acid/100 g solids, and the bath solids content is 5 to 25%, preferably 8 to 18%.

The electrophoretic lacquer according to the invention is suitable for coating workpieces with an electrically conductive surface, e.g. metal, electrically conductive (e.g. metallised) plastic, electrically conductive wood or electrically conductive coatings (e.g. lacquers), for example for the priming and/or one-coat lacquering of domestic and electrical appliances, steel furniture, structural components and agricultural machinery and car accessories as well as car bodies, particularly for the clear lacquer coating of aluminium, such as e.g. of pretreated aluminium profiles, and for the sealing of conductive coatings (e.g. electrophoretic lacquer coatings).

The coatings produced with the electrophoretic lacquer according to the invention can, however, also be provided with other lacquer coatings in the conventional way to form a multi-coat construction.

In a suitable coating plant, the substrate to be coated is immersed in the electrophoretic lacquer bath filled with the electrophoretic lacquer according to the invention and is connected as the cathode in a DC circuit opposite a counter-electrode. These coating plants are known to the person skilled in the art and described e.g. in "Glasurithandbuch" 1984, pages 374 to 384.

A film of up to film thicknesses of 60 μm, preferably between 10 and 50 μm, is deposited, e.g. at a coating temperature of 15 to 30° C., preferably 18 to 22° C. with a DC voltage of 50 to 500 volts, preferably 100 to 300 volts for a coating period of 1 to 5 minutes, preferably 2 to 3 minutes.

The deposition can take place both intermittently and continuously.

The deposited film is freed from any adhering bath material by rinsing with ultrafiltrate and/or deionised water, and freed from any droplets of water that are clinging on by blowing off in an optionally heated air stream or by supported evaporation with an IR radiator, and exposed to high-energy radiation, such as electron beam radiation, preferably UV radiation, for the purpose of curing.

For the radiation curing of the coating compound according to the invention, any known sources of radiation can be used. Ad radiation sources, for example, with emissions in the wavelength range of 180 to 420 nm, particularly 200 to 400 nm, are suitable. Examples of these UV radiation sources are high-pressure, medium-pressure and low-pressure mercury vapour radiators, gas discharge tubes such as e.g. xenon vapour, xenon/mercury vapour, (low-pressure) germanium vapour lamps, UV light-emitting diodes and UV light-emitting lasers. The irradiation can also take place with pulsed radiation, e.g. with pulsed UV radiation. So-called high-energy electron flash generators (UV flash lamps), as described e.g. in WO-A-94 11 123 or EP-A-525 340 and commercially available, are particularly preferably used as sources of radiation.

The irradiation period is in the range of e.g. 1 millisecond to 30 minutes, depending on the lacquer system and source of radiation. The distance from the source of radiation to the substrate surface to be irradiated is e.g. 2 to 50 cm, preferably 5 to 10 cm. The irradiation period is selected such that, as far as possible, a complete cure is achieved, i.e. the formation of the required technological properties is guaranteed. For this purpose, the substrate surface to be irradiated can be passed in front of the source of radiation several times, or, with the preferred use of UV flash lamps, the irradiation can take place with a multiple flash discharge. The flashes can be triggered e.g. every 4 seconds, since the UV flash lamps do not require any bum-in period.

To avoid any radiation leakage, the sources of radiation are shielded against the environment.

In addition, it is possible to apply thermal activation to crosslink the coating compounds according to the invention, in order to cure areas that can only be exposed to the radiation inadequately.

For this purpose it can be advantageous to incorporate conventional free-radical initiators that are capable of thermal activation, so that, after the irradiation or at the same time as the irradiation, a thermally activated free-radical polymerisation takes place.

Examples of free-radical initiators that are capable of thermal activation are organic peroxides, organic azo compounds or C—C-splitting initiators, such as e.g. dialkyl peroxides, peroxocarboxylic acids, peroxide carbonates, peroxide esters, hydroperoxides, ketone peroxides, azodinitriles or benzopinacole silyl ethers.

The free-radical initiators that are capable of thermal activation can also be used in a mixture. The preferred amounts are 0.1 to 5 wt. %, based on the sum of components (a1) and (a2), which can be polymerised by free radicals.

The films deposited with the aqueous electrophoretic lacquer according to the invention and cured are distinguished by high gloss, very good adhesion and good edge coverage. In addition to high scratch resistance, they exhibit excellent resistance to acids, alkalis and solvents and to industrial atmospheres, particularly acidic waste gases, such as sulfur dioxide, particularly in a damp atmosphere, which can be proved e.g. by the Kesternich test (DIN or ISO 3231).

Other advantages are a fully automatic process, high application efficiency, low-waste implementation as a result of closed circuits, low-solvent or solvent-free operation, extremely short curing times and low thermal stress to the substrates to be lacquered.

EXAMPLE 1

400.2 g of acetone, 133.0 g of diethylaminopropanediol and 849.8 g of a polyester diol consisting of neopentyl glycol, adipic acid and isophthalic acid (OH value=106 mg KOH/g solid resin) are initially placed in a reaction vessel with a stirrer, thermometer and reflux condenser and reacted with 510.4 g of isophorone diisocyanate at 60° C., until an NCO content of 1.7% is reached.

106.6 g of hydroxyethyl acrylate are added to the NCO prepolymer solution thus obtained and stirred at 60° C. until the NCO content has fallen below 0.2%.

551.0 g of the polyurethane acrylate thus obtained are diluted with 188.9 g of trimethylolpropane triacrylate, neutralised with 58.7 g of 50% formic acid and, after stirring for 1 hour at 60° C., dispersed in 1194.6 g of deionised water. The acetone is removed by vacuum distillation.

The dispersion thus obtained has a solids content (30 minutes 150° C.) of 35% and a content of double bonds of 63 g bromine/100 g solids.

9.0 parts by weight of 2-hydroxy-2-methyl-1-phenylpropanone are dispersed in 857.1 parts by weight of the dispersion. This is then diluted with 1133.9 parts by weight of deionised water.

In the electrophoretic lacquer bath thus obtained, zinc phosphated steel plates are coated at a bath temperature of 25° C. for 2 minutes with a series resistor of 200 ohms with 100 to 200 volts.

The deposited film is rinsed with water and freed from any water droplets that are clinging on by blowing off with compressed air. It is then cured on a belt conveyor with 2 UV radiators (80 W/cm) at a belt speed of 3×3 m. The cured films have a film thickness of 15 to 30 μm, are high-gloss and display very good flow.

Various tests were performed on the cured films with a 20 μm film thickness; the results for Erichsen indentation, crosshatch adhesion test and chemical resistance are listed below.

| | |
|---|---|
| Erichsen indentation according to EN-ISO 1520: | 9–10 mm |
| Crosshatch according to EN-ISO 2409: | no detachment |

Chemical resistance of vehicle lacquers based on VDA test specification 621-412:
10 minutes xylene no swelling or detachment
60 seconds acetone no swelling or detachment.

The invention claimed is:

1. An aqueous electrophoretic lacquer capable of being deposited cataphoretically having a solids content of 30 to 70 wt. % comprising
   an aqueous dispersion A) comprising 40 to 85 wt. % of component a1) comprising at least one cationically modified polyurethane (meth)acrylate having terminal, ethylenically unsaturated (meth)acrylate double bonds and 15 to 60 wt. % of component a2) comprising at least one reactive thinner having at least two ethylenically unsaturated (meth)acrylic double bonds;
   wherein the polyurethane (meth)acrylate comprises a cationically modified urethane prepolymer having terminal NCO groups bonded via groups selected from the group consisting of urethane, urea, amide and ester groups to the terminal ethylenically unsaturated (meth)acrylic double bonds to form the polyurethane (methacrylate); and
   wherein the (meth)acrylic double bonds of the mixture of component a1) and component a2) correspond to a bromine number of 20 to 150 g bromine/100 g solids and
   wherein the urethane prepolymer is the reaction product of
   i) at least one isocyanate selected from the group consisting of aliphatic polyisocyanate, cycloaliphatic polyisocyanates, araliphatic polyisocyanates, aromatic polyisocyanates and any mixtures thereof, said polyisocyanates having a molecular weight of more than 174;
   ii) at least one polyhydroxyl compound with a number average molecular weight of Mn of 400 to 5000,
   iii) at least one compound having a group that is cationic by neutralization and two groups that are reactive with isocyanates, and
   iv) optionally, at least one polyhydroxyl compound having a number average molecular weight Mn of 60 to less than 400.

2. The electrophoretic lacquer according to claim 1 further comprising at least one photo-initiator, at least one free-radical initiator capable of thermal activation, conventional auxiliary substances, additives, pigments and fillers.

3. The electrophoretic lacquer according to claim 1, wherein the bromine number of component a1) is 4 to 80 g bromine/100 g solid resin.

4. An The electrophoretic lacquer capable of being deposited cataphoretically having a solids content of 30 to 70 wt. % comprising an aqueous dispersion A) comprising 40 to 85 wt. % of component a1) comprising at least one cationically modified, polyurethane (meth)acrylate having terminal, ethylenically unsaturated (meth)acrylate double bonds and 15 to 60 wt. % of component a2), a reactive thinner having at least two ethylenically unsaturated (meth)acrylic double bonds;
   wherein the (meth)acrylic double bonds of the mixture of component a1) and component a2) correspond to a bromine number of 20 to 150 g bromine/100 g solids, and;
   wherein the polyurethane (meth)acrylate is the reaction product of a urethane prepolymer with terminal NCO groups and at least one compound having at least one ethylenically unsaturated (meth)acrylic group and having at least one group that is reactive with isocyanate and optionally, at least one compound having at least one group that is reactive with isocyanate and having no (meth)acrylic double bonds:
   wherein the urethane prepolymer is the reaction product of
   i) at least one isocyanate selected from the group consisting of aliphatic polyisocyanate, cycloaliphatic polyisocyanates, araliphatic polyisocyanates, aromatic polyisocyanates and any mixtures thereof, said polyisocyanates having a molecular weight of more than 174;
   ii) at least one polyhydroxyl compound with a number average molecular weight of Mn of 400 to 5000,
   iii) at least one compound having a group that is cationic by neutralization and two groups that are reactive with isocyanates, and
   iv) at least one polyhydroxyl compound having a number average molecular weight Mn of 60 to less than 400; and
   wherein the at least one compound having at least one ethylencially unsaturated (meth)acrylic group and at least one group reactive with isocyanate is selected from the group consisting of hydroxyalkyl (meth)acrylates, aminoalkyl(meth)acrylates, (meth)acrylamides, compounds having one group reactive with isocyanate and one group suitable for the addition of a (meth) acrylic ester group and subsequent addition of the (meth)acrylic ester group and mixtures of any of the above; and
   wherein component a1), polyurethane (meth)acrylate and component a2) reactive thinner are at least partially neutralized and formed into the aqueous dispersion.

5. A process for forming an aqueous dispersion A) comprising 40 to 85 wt. % of component a1) comprising at least one cationically modified polyurethane (meth)acrylate having terminal, ethylenically unsaturated (meth)acrylate double bonds and 15 to 60 wt. % of component a2) comprising at least one reactive thinner having at least two ethylencially unsaturated (meth)acrylic double bonds useful for electrophoretic lacquers, the process comprising the steps of forming a urethane prepolymer with terminal NCO groups and reacting the urethane prepolymer with at least one compound having at least one ethylenically unsaturated (meth)acrylic group reactive with isocyanate and optionally, with at least one compound having at least one group reactive with isocyanate and having no (meth)acrylic double bonds to form a polyurethane (meth)acrylate; and mixing the resulting polyurethane (meth)acrylate with at least one reactive thinner having at least two ethylenically unsaturated double bonds and subsequently, at least partially neutralizing the resulting mixture and adding aqueous fluid to form the aqueous dispersion;

wherein the (meth)acrylic double bonds of the mixture of component a1) and component a2) correspond to a bromine number of 20 to 150 g bromine/100 g solids, wherein the urethane prepolymer having terminal NCO groups is the reaction product of:
  i) at least one isocyanate selected from the group consisting of aliphatic polyisocyanate, cycloaliphatic polyisocyanates, araliphatic polyisocyanates, aromatic polyisocyanates and any mixtures thereof, said polyisocyanates having a molecular weight of more than 174;
  ii) at least one polyhydroxyl compound with a number average molecular weight of Mn of 400 to 5000,
  iii) at least one compound having a group that is cationic by neutralization and two groups that are reactive with isocyanates, and
  iv) optionally, at least one polyhydroxyl compound having a number average molecular weight Mn of 60 to less than 400; and wherein the at least one compound having at least one ethylenically unsaturated (meth)acrylic group and at least one group reactive with isocyanate is selected from the group consisting of hydroxyalkyl (meth)acrylates, aminoalkyl(meth)acrylates, (meth)acrylamides, compounds having one group reactive with isocyanate and one group suitable for the addition of a (meth)acrylic ester group and subsequent addition of the (meth)acrylic ester group and mixtures of any of the above.

6. Process for electrophoretic lacquering of electrically conductive substrates which comprises the steps of immersing the electrically conductive substrate in an aqueous electrophoretic lacquer and applying a coating thereon whereby the substrate is connected as a cathode and curing the coating on the substrate with high-energy radiation; wherein the electrophoretic lacquer comprises the composition of claim 1.

7. The process of claim 6 wherein the coating is additionally cured by thermal means.

8. An electrically conductive substrate coated according to the process of claim 6.

9. An electrically conductive substrate coated according to the process of claim 6 having in addition a multi-coat finish thereon.

* * * * *